United States Patent
Daniel

(10) Patent No.: US 7,950,577 B1
(45) Date of Patent: May 31, 2011

(54) APPARATUS, SYSTEM AND METHOD FOR VERIFYING AUTHORIZED USING AN IMMIGRATION CUSTOMS VISA CARD

(75) Inventor: Isaac Sayo Daniel, Miami, FL (US)

(73) Assignee: F3M3 Companies, Inc. DE (US)

(*) Notice: Subject to any disclaimer, the term of this patent is extended or adjusted under 35 U.S.C. 154(b) by 0 days.

(21) Appl. No.: 12/626,841

(22) Filed: Nov. 27, 2009

Related U.S. Application Data

(63) Continuation-in-part of application No. 12/584,375, filed on Sep. 4, 2009.

(60) Provisional application No. 61/277,989, filed on Sep. 29, 2009.

(51) Int. Cl.
*G06K 5/00* (2006.01)

(52) U.S. Cl. ........ 235/380; 235/382; 235/385; 235/379; 705/5

(58) Field of Classification Search ............. 235/380, 235/382, 385, 379; 705/5
See application file for complete search history.

(56) References Cited

U.S. PATENT DOCUMENTS

| | | | |
|---|---|---|---|
| 6,094,640 A * | 7/2000 | Goheen | 705/5 |
| 2001/0016825 A1* | 8/2001 | Pugliese et al. | 705/5 |
| 2003/0085808 A1* | 5/2003 | Goldberg | 340/531 |
| 2004/0035928 A1* | 2/2004 | Anderson | 235/385 |
| 2008/0223925 A1* | 9/2008 | Saito et al. | 235/380 |
| 2008/0281740 A1* | 11/2008 | Wu | 705/35 |
| 2009/0176559 A1* | 7/2009 | Buchholz et al. | 463/25 |
| 2009/0313129 A1* | 12/2009 | Rothschild | 705/17 |
| 2010/0023400 A1* | 1/2010 | DeWitt | 705/14.53 |
| 2010/0135524 A1* | 6/2010 | Durst et al. | 382/100 |
| 2010/0141453 A1* | 6/2010 | Finn | 340/572.7 |

* cited by examiner

*Primary Examiner* — Allyson N Trail
(74) *Attorney, Agent, or Firm* — Carol N. Green, Esq.

(57) ABSTRACT

The present disclosure relates generally to an apparatus, system and method, and more particularly to an electronic immigration customs visa card, which includes biometric verification means for verifying a biometric identifier stored thereon used to uniquely identify the immigration customs visa cardholder. The system and method includes the electronic immigration customs visa card and a passport reader connected to a computer, where the computer is configured for verifying an individual's authorized entry at a country's port of entry by validating a reusable immigration customs visa card's compliance with at least one immigration protocol for obtaining access into a country.

29 Claims, 7 Drawing Sheets

APPARATUS, SYSTEM AND METHOD FOR VERIFYING AUTHORIZED USING AN IMMIGRATION CUSTOMS VISA CARD

I. PRIORITY CLAIM

This patent application is a continuation in part of and claims priority to U.S. Non-Provisional patent application Ser. No. 12/584,375 titled An Apparatus, System And Method For Storing Passport Information filed Sep. 4, 2009 and the U.S. Provisional patent application Ser. No. 61/277,989 titled A Method of Processing an Immigration Customs Visa Card filed on Sep. 29, 2009. The entire disclosures of the aforementioned applications are incorporated by reference as if fully stated herein.

II. FIELD OF THE INVENTION

The present disclosure relates generally to an apparatus, system and method, and more particularly to an electronic immigration customs visa card, which includes biometric verification means for verifying a biometric identifier stored thereon used to uniquely identify the immigration customs visa cardholder. The system and method includes the electronic immigration customs visa card and a passport reader connected to a computer, where the computer is configured for verifying an individual's authorized entry at a country's port of entry by validating a reusable immigration customs visa card's compliance with at least one immigration protocol for obtaining access into a country.

III. BACKGROUND OF THE INVENTION

In the wake of the terrorist attacks of Sep. 11, 2001, most foreign countries require foreigners entering their country to provide a valid passport that can be scanned and/or optically reviewed as part of the country's immigration and customs protocol. Additionally, certain businesses in foreign countries mandate proof of a valid passport as identification from foreigners prior to entering into large business transactions causing foreigners to travel with their passports at all times during their stay. However, travelling with one's passport on a daily basis places the foreigner in a vulnerable position for loss and identity theft. As such, most individuals would understandably prefer to secure their passport at a hotel rather than carry their passports with them as they sightsee and/or conduct business. Thus, there is a need for valid proof of authorized entry into a country in a manner that is convenient to carry during a foreigner's daily travels as they sightsee or conduct business abroad.

Lost and/or stolen passports are a major inconvenience to replace, as notification to the proper authorities and obtaining a replacement generally causes an unexpected and often costly delay. This inconvenience may transcend beyond additional costs for an overstay, as it may also delay the passport owner's entry and/or reentry into a destination country. The prior art teaches a passport identification card, system and method, which includes the passport holder's identification information, i.e. the photograph, names, date of birth, etc., printed in plain view. If this prior art passport identification card is lost and/or stolen, counterfeiters can artfully replace the photograph with another of like and/or similar features to closely match the original passport holder's description of weight, height, age, etc. Thus, there is a need for a secure passport identification apparatus, system and method for identifying an individual, wherein the identification information is hidden from plain view, maintaining the security and integrity of the passport holder's identification information.

Accordingly, the various embodiments and disclosures described herein satisfies these long felt needs and solves the limitations of the prior art in a new and novel manlier.

SUMMARY OF THE INVENTION

An objective of the apparatus, system and method disclosed herein is to provide a convenient reusable immigration customs visa ("ICV") card that may be used as valid identification for an individual.

Another objective of the apparatus, system and method disclosed herein is to provide an electronic ICV card that includes biometric verification means positioned within and thereon for receiving and storing a biometric identifier used as a unique identifier of the immigrations customs visa cardholder.

Still yet another objective of the invention is to provide a system and method of verifying that an ICV card has complied with at least one immigration protocol for obtaining access into a country.

The present disclosure relates generally to an apparatus, system and method, and more particularly to an ICV card which includes an electronic data card configured for storing thereon a biometric identifier and/or passport information, wherein the ICV card includes biometric verification means positioned within. Biometric verification means includes but is not limited to: fingerprint recognition means, hand geometry recognition means, palm geometry recognition means, iris recognition means, retina recognition means, speech recognition means and any other biometric verification means that are known and used in the arts. The aforementioned biometric verification means may include at least one microprocessor disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry.

The ICV card includes at least one microprocessor positioned within. The at least one microprocessor is configured for processing at least one biometric sample, e.g. validating a biometric sample with the biometric identifier stored on the ICV card. "Biometric identifier" as used herein describes a biometric sample obtained from an individual that uniquely identifies the individual based on his/her intrinsic physical traits, e.g. fingerprints, retina scan, palm geometry, hand geometry, speech, and or other biometric identifiers that are used in the arts.

The ICV card is selected from the group of electronic devices consisting essentially of smart cards, memory cards, and microprocessor cards, with memory means embedded therein for storing a biometric identifier and/or at least one or more passport information. Passport information may comprise of any one or more of the following: photograph, issuing country, passport number, surname, given names, address, nationality, date of birth, place of birth, sex, race, height, color of eyes, date of issue, passport expiration date, occupation, place of issue, authority or endorsement and the like.

ICV card may also include a security feature comprising of a thin film of mesh conductive wires that are interlaced with each other and positioned in between the two exterior sides of the ICV card. The mesh conductive wires are interconnected with each other and with an electronic circuit.

The electronic circuit includes a circuit board having at least one microprocessor positioned thereon and connected to communication means, e.g. a transceiver, wherein the transceiver is configured for communicating with a passport reader and/or a computer. Both the passport reader and the ICV card are configured for communicating with the computer in any of the following manner: wirelessly or wired.

ICV card is a functional component of a system and method, where the system and method comprises of: a computer; the ICV card configured for electronically storing thereon a biometric identifier and/or passport information; biometric verification means positioned within the ICV card, where the biometric verification means is configured for validating a biometric sample by comparing the biometric sample with a biometric identifier electronically stored on the ICV card and/or the computer's memory means; and a passport reader connected to the computer either wirelessly or wired configured for reading any one or more of the following: a card number, biometric sample, biometric identifier stored on the ICV card and/or at least one passport information if stored thereon.

Computer is configured for validating the ICV card's compliance with at least one immigration protocol for obtaining access into a country. The at least one immigration protocol includes but is not limited to: depositing a fee into a registry; authenticating the identity of the ICV cardholder via at least one biometric verification means; accepting receipt of the ICV card upon the ICV cardholder leaving a country; authenticating the identity of ICV cardholder for the return of the deposit fee; or returning the deposit fee to the ICV cardholder.

The system may include software components, which may comprise of at least one microprocessor; a passport card application program executable on the computer and a computer processor with executable instruction code configured for performing the varied functions of the system and methods of the invention. The at least one microprocessor is configured for validating a biometric sample with a biometric identifier stored on an ICV card and configured for communicating with the computer via a passport card application program. ICV card is also configured for being accessed by the passport card application program executable on the computer.

Computer is configured for determining the validity of an ICV card based on said ICV card's compliance with at least one immigration protocol for obtaining access into a country.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

Figure 1:
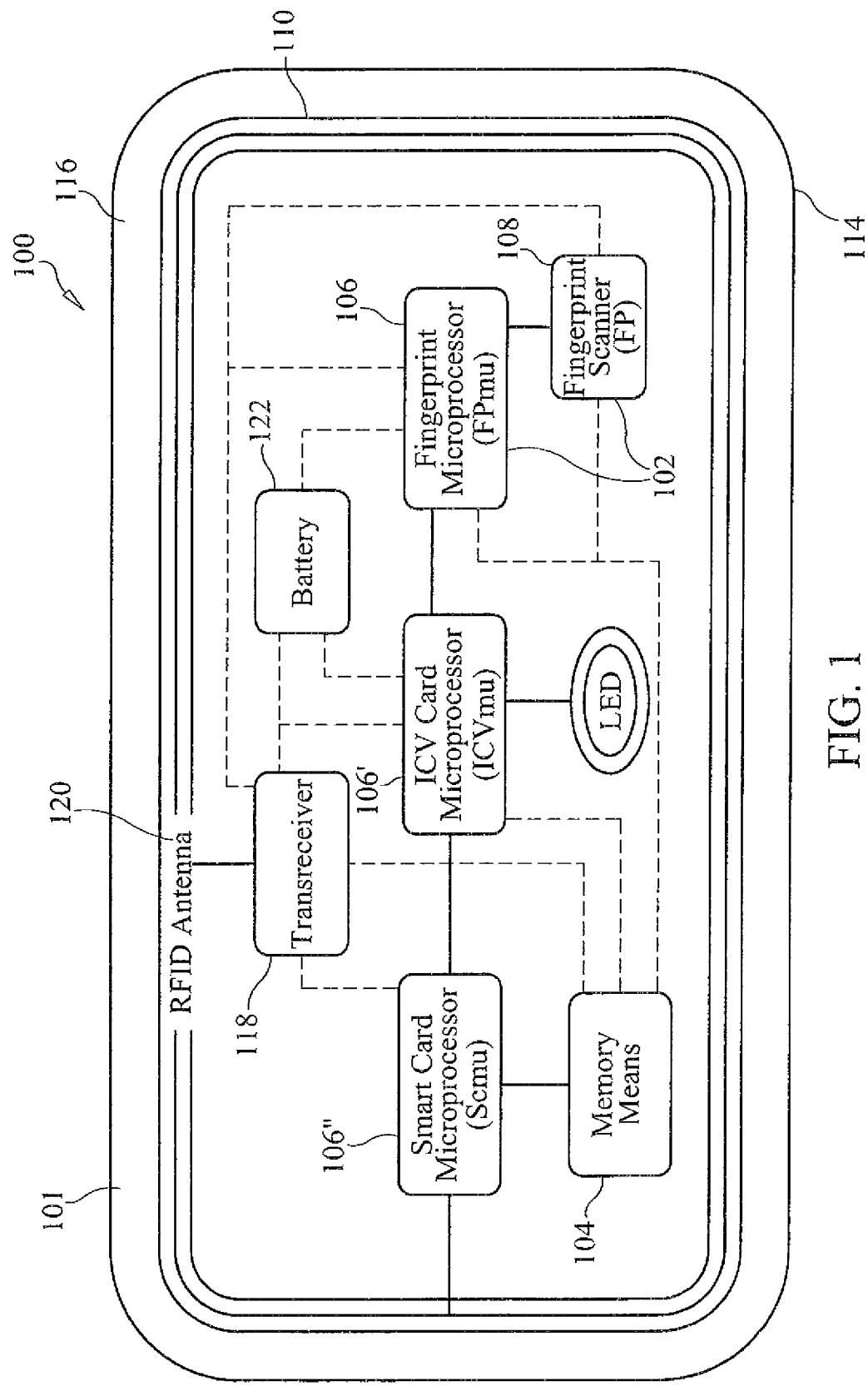
FIG. 1 is an exemplary embodiment of the electronic circuit of the ICV card according to an embodiment.

The following discussion describes in detail, varied embodiments of the system and methods disclosed herein. However, this discussion should not be construed, as limiting the invention to those particular embodiments, as practitioners skilled in the art will appreciate that an apparatus or system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

FIG. 1 is an exemplary embodiment of the electronic circuit of the ICV card 100 according to an embodiment. The ICV card 100 includes an electronic data card 101 configured for storing thereon a biometric identifier and/or passport information, wherein the ICV card 100 includes biometric verification means 102 positioned within. The ICV card 100 is selected from the group of electronic devices consisting essentially of smart cards, memory cards, and microprocessor cards, with memory means 104 embedded therein for storing passport information and or a biometric identifier.

Memory means 104 may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, memory means 104 may comprise of both hardware and software components. In the preferred embodiment, memory means 104 is embedded within at least one microprocessor 106 where the information stored therein is encrypted for security purposes.

Biometric verification means 102 includes but is not limited to: fingerprint recognition means, hand geometry recognition means, palm geometry recognition means, iris recognition means, retina recognition means, speech recognition means. The aforementioned biometric verification means 102 may include at least one microprocessor 106 disposed in communication with for example, a fingerprint scanner 108, hand geometry scanner, a palm geometry scanner, iris scanner, retina scanner, or speech recognition means, i.e. a user interface which includes an audio receiving circuit capable of receiving audio signals at predetermined frequencies and/or with additional hardware complete with electronic circuitry, and such other biometric verification means 102 that are known and used in the arts. Prior to the ICV card 100 being used, a biometric sample for the cardholder is obtained and enrolled as a biometric identifier and stored on the ICV card 100 for future reference and comparison.

The ICV card 100 may include at least one or more microprocessors 106, 106', 106", positioned within. Illustratively, the biometric verification means 102 shown herein includes a fingerprint microprocessor 106 disposed in communication with a fingerprint scanner 108 for processing at least one biometric sample, e.g. the cardholder's fingerprint, i.e. where the fingerprint microprocessor 106 validates the image of the biometric sample, controls the functionality of the fingerprint scanner 108, and generates the varied algorithms for storage of the biometric sample obtained. As shown in FIG. 1, illustratively, there are three microprocessors 106, 106', 106", the fingerprint microprocessor 106, the ICV card microprocessor 106' and the smart card microprocessor 106". The ICV card microprocessor 106' is configured for controlling the power source, communicating with, and controlling the functionality of the fingerprint microprocessor 106. Smart card microprocessor 106" controls the ICV card 100 and its communications with a passport reader and/or a computer and as such controls both the fingerprint microprocessor 106, and the ICV card microprocessor 106'.

In one embodiment, the ICV cardholder's passport information is stored within the memory means 104 embedded within the smart card microprocessor 106". In another embodiment, both the ICV cardholder's passport information and biometric identifier are stored within the memory means 104 embedded within the smart card microprocessor 106". In yet another embodiment, only the biometric identifier is stored within the memory means 104 embedded within the smart card microprocessor 106. "Biometric identifier" as used herein describes a biometric sample obtained from an individual that uniquely identifies the individual based on his/her intrinsic physical traits, e.g. fingerprints, retina scan, palm geometry, hand geometry, speech, and or other biometric identifiers that are used in the arts.

The ICV card 104 may also include a security feature comprising of a thin film of mesh conductive wires 110 that are interlaced with each other and positioned in between the two exterior sides 112 (not shown) of the ICV card 100. The mesh conductive wires 110 are interconnected with each other and with an electronic circuit 114, where the electronic circuit 114 includes a circuit board 116 having at least one microprocessor 106 positioned thereon and connected to a transceiver 118, wherein the transceiver 118 is configured for communicating, i.e., transmitting and receiving electronic communications, between the ICV card 100 and a passport reader and/or a computer. The ICV card 100 as exemplified herein may be adapted with electrical contacts for establishing wired and/or wireless connectivity to a computer and/or a passport reader.

Microprocessor 106 positioned within is electrically connected to the transceiver 118 for communicating via an antennae 120 with a passport reader and/or a computer. The ICV card 100 communicates via short range wireless protocol, where the transceiver 118 may include an integrated radio and shared antennae 120, or direct conversion receivers; digital radio receivers; super heterodyne receivers; or any other receivers or transceivers 118, 118' that are well known and used in the arts. Exemplary transceivers 118, 118' may include but is not limited to Blue Tooth, ZigBee, 802.11 series, or any other short range wireless protocol for transmitting wireless signals that is well known and used in the arts and other future short range wireless protocol suitable for transmitting data over a short distance. Illustratively, as shown herein, the ICV card 100 is configured with a RFID antenna 120 in combination with a Radio-Frequency Identification tag for communicating with a passport reader and/or computer using radio waves.

ICV card 104 may also include a battery 122, which serves as a power source for the at least one or more microprocessors 106, 106', 106" positioned therein. In one embodiment of the invention, ICV card 100 is adapted with electrical contacts for establishing wired and/or wireless connectivity to a charger, e.g. a docking station, and as such may not include a battery 120.

Figure 2:
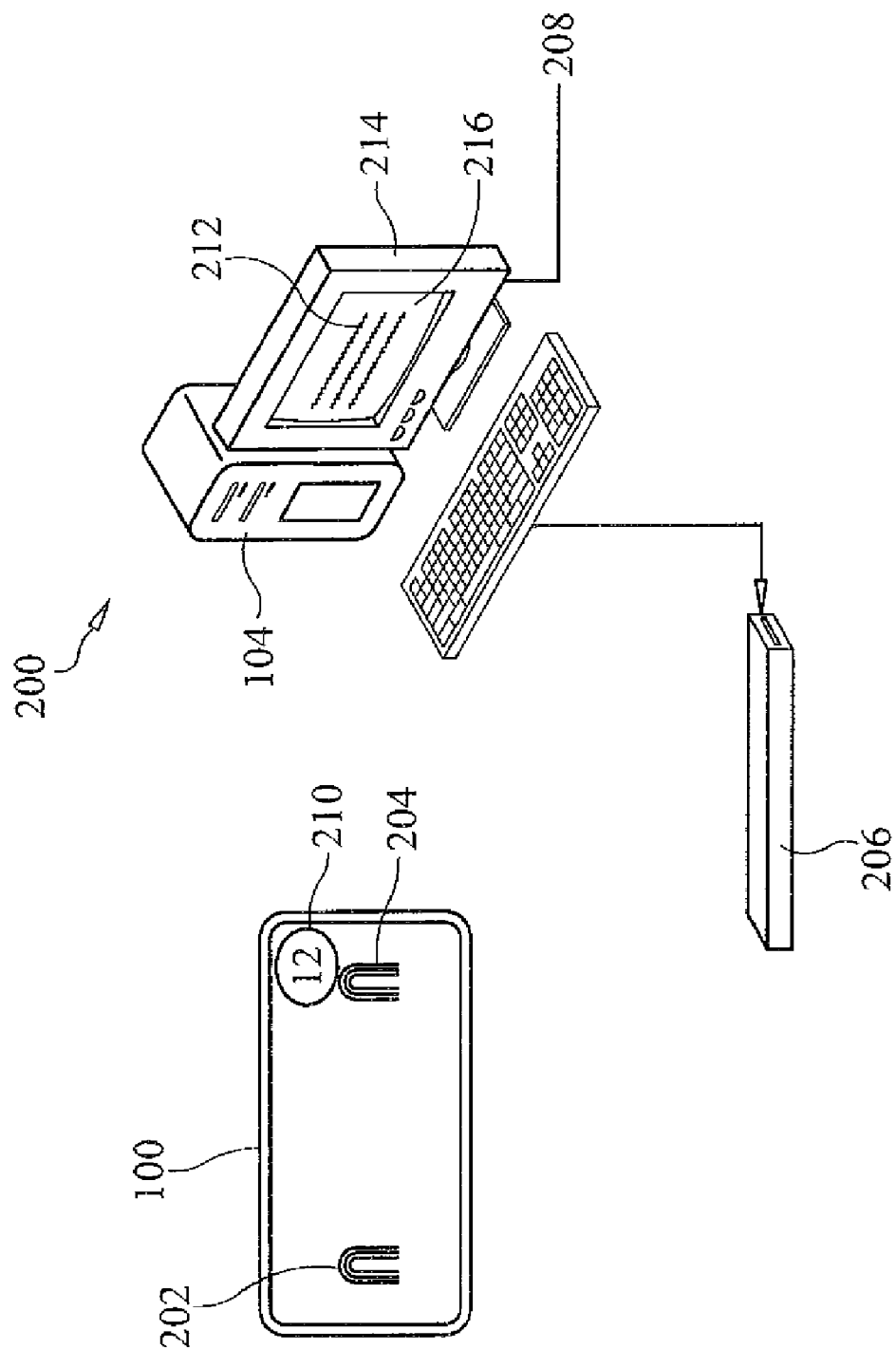
FIG. 2 shows a block diagram representing a system in accordance with one embodiment.

FIG. 2 shows a block diagram representing a system 200 in accordance with one embodiment. The ICV card 100 is a functional component of a system 200, where the system 200 comprises of the ICV card 100 configured for electronically storing thereon at least one biometric identifier 202 and/or passport information; biometric verification means 102 positioned within the ICV card 100, where the biometric verification means 102 is configured for validating a biometric sample 204 by comparing the biometric sample 204 with a biometric identifier 202 stored thereon; and a passport reader 206 connected to a computer 208 for reading at least the biometric identifier 202 and/or passport information stored on the ICV card 100. The ICV card 100 contains means for establishing wired and/or wireless connectivity with external devices and internal memory means 104 for retaining the biometric identifier 202 and/or passport information, and for securing the biometric identifier 202 and/or passport information stored thereon, via for example a microchip and/or at least one microprocessor 106 where the memory means 104 is embedded within.

ICV card 100 may also include an ICV card number 210 which acts as a unique identifier for the ICV card 100. Icy card number 210 may be assigned via a random number generating program, comprising of numerals, characters, alphanumeric characters or any other unique identifiers that are known and used in the arts.

Passport reader 206 is connected to the computer 208 either wirelessly or wired, where passport reader 206 is configured for scanning and reading any one or more of the following: the ICV card number 210, at least one biometric sample 204, and/or the biometric identifier 202 stored on the ICV card 100, and/or passport information if stored thereon. Passport reader 206 as exemplified may be adapted with electrical contacts for establishing wired and/or wireless connectivity to ICV cards 100, 100', 100" and/or the computer 208. Passport reader 206 may be integrated within a computer 208 (e.g. with a slot for wired card connectivity), an external device (e.g., USB connection to a small housing), or be integrated into other devices that are known and used in the arts. Alternatively, a wireless connection may be established, wherein communication access is established in response to proximity or manual activation of the passport reader 206.

Computer 208, e.g. a network enabled computer 208, a laptop or personal digital assistant subject to wired/wireless connectivity is configured with a passport card application program 212 to allow communications between the ICV card 100 via passport reader 206. The passport card application program 212 may comprise in part of a browser, such as for use on a personal computer 208 or similar browsing device.

Computer 208 includes a processor 214 with computer executable instruction code 216 readable by the processor 214, where the computer processor 214 is configured for determining the validity of an ICV card 100 based on the ICV card's 100 compliance with at least one immigration protocol 217 (not shown) for obtaining access into a country. The at least one immigration protocol 217 (not shown) includes but is not limited to: depositing a fee into a registry; authenticating the identity of the ICV cardholder via at least one biometric verification means 102; accepting receipt of the ICV card 100 upon the cardholder leaving a country; authenticating identity of ICV cardholder for the return of the deposit fee; or returning the deposit fee to the ICV cardholder.

Processor 214 may be any type of processor, such as a central processing unit (CPU), a microprocessor 106, a front end processor, a coprocessor, a single-core processor, a multi-core processor, as well as any known processor 214 that's used in the arts. The computer executable instruction code 216 may be any type of computer executable instruction code 216, which may be in the form of a computer program, the program being composed in any suitable programming language or source code, such as C++, C, JAVA, JavaScript, HTML, XML, and other programming languages.

Computer 208 is disposed in communication with memory means 104, i.e. illustratively an electronic database, configured for storing at least one ICV cardholder's passport information. Memory means 104 may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory means 204 may include a software component, such as, but not limited to, an electronic database as illustrated in FIG. 2, file management software, and any other software component as used in the arts. In yet another embodiment, memory means 204 may comprise of both hardware and software components.

System 200 includes software components which comprise of a passport card application program 212 executable on the computer 208, where the computer 208 is configured for accessing an ICV cardholder's passport information stored on its memory means 104. Computer 208 is also configured for determining the validity of an ICV card's 100 compliance with at least one immigration protocol 217 (not shown) for obtaining access into a country. System 200 may include an ICV card 100 configured for being accessed by the passport card application program 212 executable on the computer 208.

In one embodiment, upon entering a country's port of entry, by land, sea or air, immigration protocol 217 (not shown) may require the ICV cardholder to authenticate their authorization for legal access into the country's borders. As such, upon presentation of the ICV card 100, passport reader 206 reads the ICV card number 210 either wirelessly or wired, and transmits that ICV card number 210 to the computer 208, where the ICV card 100 is authenticated as a valid issued card. ICV cardholder may also be required to submit an in-person biometric sample 204, which will be verified by the biometric verification means 102 positioned on the ICV card 100. Biometric sample 204 is compared with the biometric identifier 202 stored thereon for validating the identity of the ICV cardholder. If the biometric sample 204 matches the biometric identifier 202, the authentication results are transmitted to the computer 208 via the passport reader 206, and the computer 208 retrieves the passport information stored in the computer's memory means 104, e.g. the electronic database, for verification of the ICV cardholder's identity with the passport information stored thereon. Accordingly, the retrieved passport information from the computer's memory means 104 can be compared visually with the physical description of the ICV cardholder.

In another embodiment, the ICV card number 210, the biometric identifier 202 and/or at least one passport information is stored on the ICV card 100. Similarly, ICV cardholder may be required to submit a biometric sample 204 which will be verified with the biometric identifier 202 stored on the ICV card. If the biometric sample 204 differs from the biometric identifier 202 after successive attempts, immigration protocols may mandate detention or at least further inquiry. Notwithstanding, passport reader 206 reads the information stored on the ICV card 100 and transmits the ICV card number 210, the biometric identifier 202 and/or at least one passport information to the computer 208 which displays the retrieved information on the computer 208 for a visual comparison of the identity of the ICV cardholder.

Figure 3:
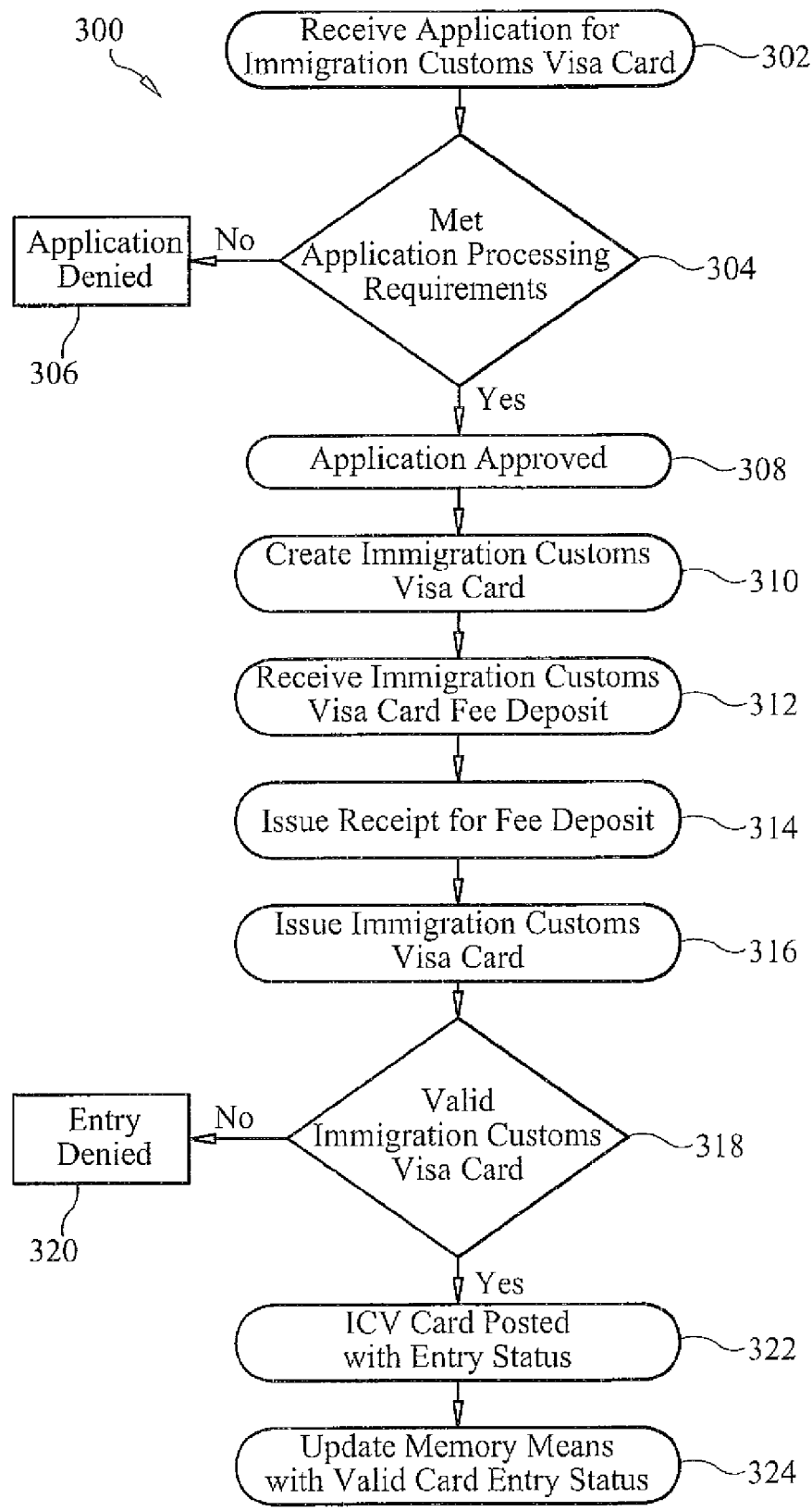
FIG. 3 is a sample flowchart of a block diagram of an exemplary method of validating an ICV card at a country's port of entry in accordance with one embodiment.

FIG. 3 is a sample flowchart of a block diagram of an exemplary method 300 of validating an ICV card 100 at a country's port of entry in accordance with one embodiment. The method 300 comprises of receiving an application for an ICV card 100 (step 302) from an applicant. A country implementing the system 200 and methods 300, 400, 500, 600, 700 disclosed herein will have specific application processing requirements that must be met in order to issue the ICV card 100 to an applicant, e.g. a valid birth certificate, verification of citizenship, etc. If the cardholder meets the application processing requirements (step 304) then the application for an ICV card 100 will be approved (step 308), otherwise the application will be denied (step 306).

Once the application for an ICV card 100 has been approved (step 308), an ICV card 100 will be created for applicant (step 310). Creating the ICV card 100 may include assigning a unique identifier as an ICV card number 210 to the ICV card 100 via a random number generating program and/or populating the ICV card 100 with the country's data. The unique identifier may comprise of numerals, characters, alphanumeric characters or any other unique identifiers that are known and used in the arts. In one embodiment, the cardholder's passport information may also be populated on the ICV card 100. It is understood that assigning an ICV card number 210 to, and/or populating the ICV Card 100 with either the country's data and/or cardholder's passport information may be done as a single or combined steps without departing from the scope of the system 200 and method 300 disclosed herein.

According to one embodiment, once the ICV card 100 has been created, it may be issued to the cardholder without any requirements for a fee deposit. In another embodiment, the cardholder is required to provide the deposit fee prior to the ICV card 100 being issued. In that embodiment, the deposit fee is received (step 312) and the cardholder's passport information is flagged with a marker indicating receipt of the deposit fee. It is understood that although a cardholder may be required to provide a deposit fee, certain rules, laws, statues or exemptions may obviate the necessity of receiving a deposit fee from certain individuals and/or organizations, e.g. an exemption or fee waiver for military personnel or senior citizens over the age of 80 years old. Notwithstanding, once the deposit fee is received (step 312), a receipt is issued for the deposit fee (step 314).

Depending on the immigration protocol 217 for the country implementing the system 200 and method 300, the ICV card 100 may be retrieved from the authorities at a local immigration office for validation at a port of entry for the country issuing the ICV card 100, or at the country's port of entry, i.e. by land, sea or air. In either event, when issued, a first biometric sample 204 is obtained and enrolled with the ICV card 100 as a biometric identifier 202, uniquely identifying the cardholder. In this manner, if the validity of the cardholder' identity, immigration status and/or authenticity of the ICV card 100 is ever challenged, an in-person biometric sample 204 may be obtained using the ICV card's biometric verification means 102, wherein the biometric sample 204 can be compared with the biometric identifier 202 stored thereon.

Thus, when the cardholder attempts to enter a country's borders, the ICV card 100 is validated (step 318) to ensure that the ICV card 100 is not a counterfeit and that the biometric identifier 202 and/or passport information electronically stored thereon is valid. If the ICV card 100 is invalid, then the cardholder's access into a country may be denied (step 320), unless the cardholder is able to satisfy the country's alternate immigrations protocols, if any. However, if the information stored thereon including the biometric identifier 202 is correct, upon validation of the ICV card 100, the cardholder will be admitted for entry and the ICV card 100 may be flagged electronically with a marker indicating the cardholder's valid entry status (step 322). The computer's memory means 104, e.g. the electronic database, will also be updated to reflect the cardholder's valid entry status (step 324).

Figure 4:
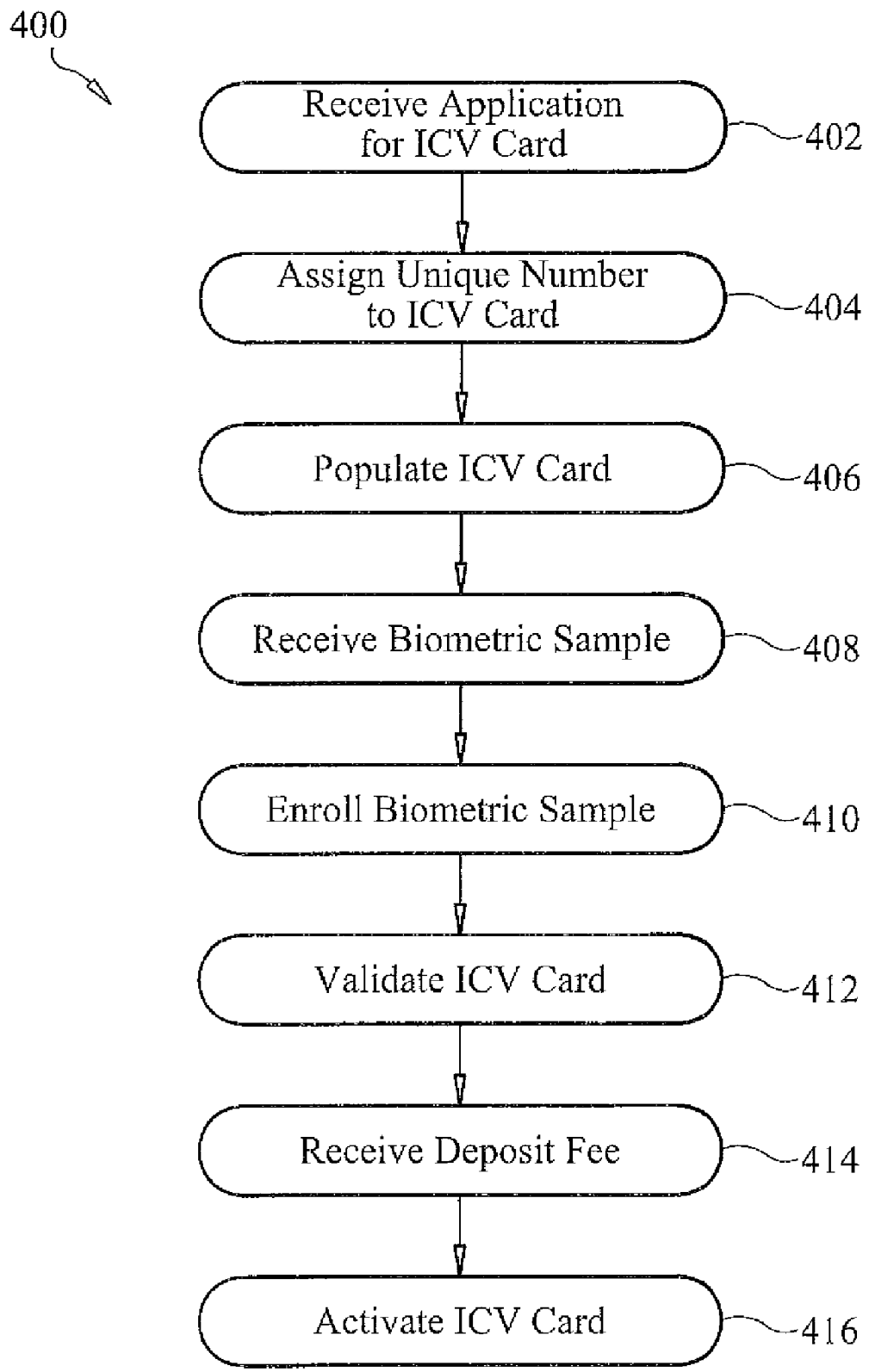
FIG. 4 is a sample flowchart of an exemplary method of activating the ICV card in accordance with one embodiment.

FIG. 4 is a sample flowchart of an exemplary detailed method 400 of activating the ICV card 100 in accordance with one embodiment. The method 400 comprises of receiving an application for an ICV card 100 (step 402) from an applicant. Applicant at a minimum must meet the country's immigration application processing requirements in order to be eligible for an ICV card 100, e.g. a valid birth certificate, proof of citizenship, etc. As previously mentioned, creating the ICV card 100 may comprise of one or more steps for assigning a unique ICV card number 210 to the ICV card 100 (step 404) and/or populating the ICV card 100 with the country's data (step 406) and/or the cardholder's passport information without departing from the scope of the disclosed method 400.

In this embodiment, applicant is required to submit a biometric sample 204 prior to the ICV card 100 being validated. As such, applicant submits a biometric sample 204, where the biometric verification means 102 receives the biometric sample 204 (step 408) and enrolls the biometric sample 204 (step 410) as a biometric identifier 202, storing the biometric identifier 202 thereon. ICV card 100 is then validated (step 412), i.e. the ICV card 100 is flagged electronically as valid, and/or the computer's memory means 104. Once the validation process is completed, the cardholder may be required to provide a deposit fee prior the ICV card 100 being activated for use. Once the deposit fee is received (step 414) the ICV card 100 is activated (step 414) for use as a means of identification for the ICV cardholder as well as proof of authorized entry into a country's borders.

Figure 5:
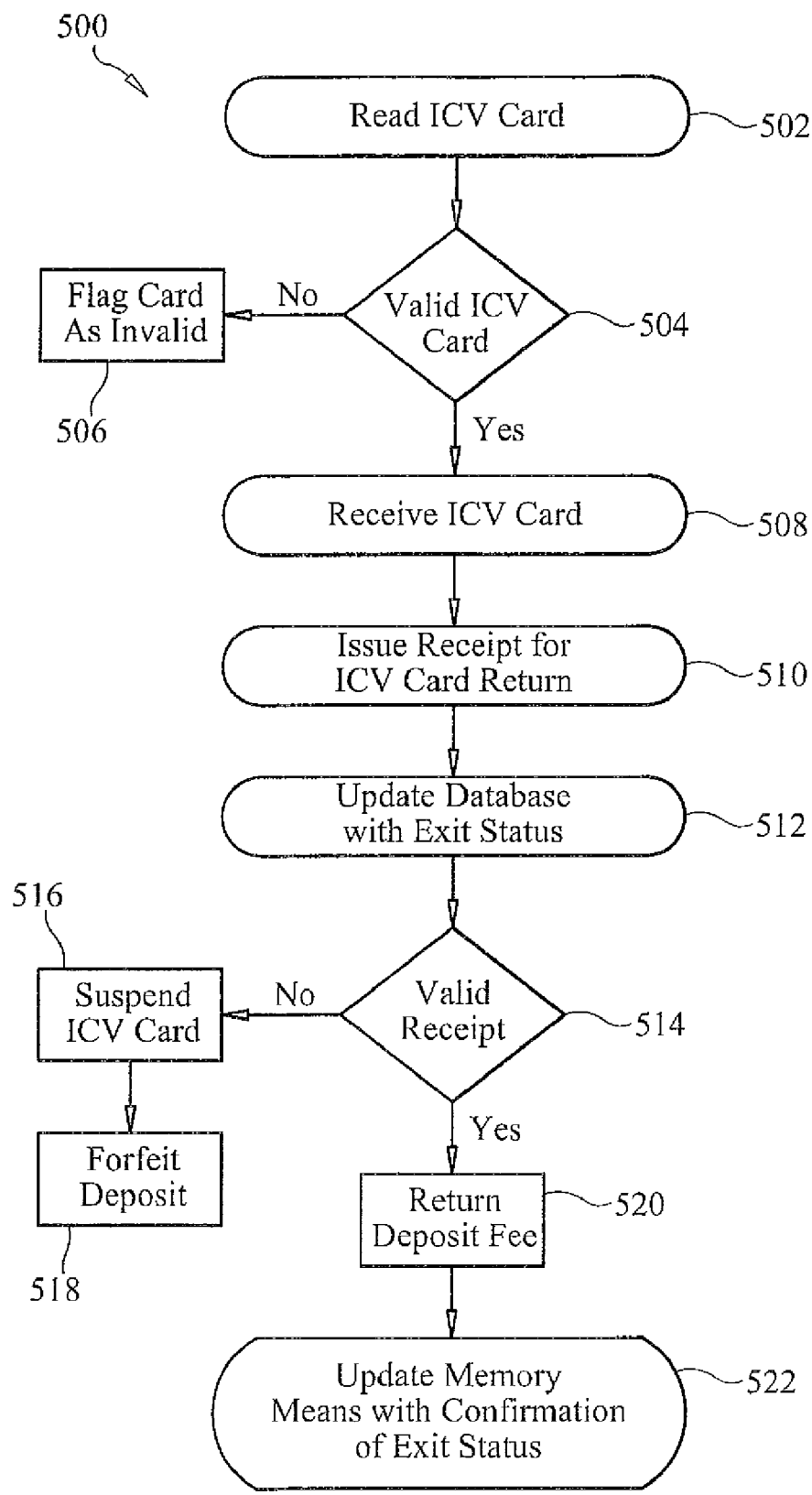
FIG. 5 is a sample flowchart of a block diagram of an exemplary method of validating an ICV card at a country's point of exit in accordance with one embodiment.

FIG. 5 is a sample flowchart of a block diagram of an exemplary method 500 of processing an ICV card 100 at a country's point of exit in accordance with one embodiment. An ICV cardholder exiting a country may be required to submit a biometric sample 204 using the biometric verification means 102 positioned within the ICV card 100. The passport reader 206 reads the ICV card 100 (step 502) for the biometric identifier 202 and/or the passport information electronically stored thereon. The system 200 validates the ICV card 100 (step 504) by verifying at a minimum that the biometric sample 204 being submitted, for example in person, matches the biometric identifier 202 stored thereon. The ICV card 100 may be configured to allow a pre-determined number of attempts for a match between the biometric sample 204 and the biometric identifier 202, prior to flagging the ICV 100 card as invalid (step 506). The verification process may also include verifying the unique ICV card number 210 as a valid issue, and/or the passport information electronically stored either on the ICV card 100 or the computer's memory means 104 as matching the cardholder presenting the ICV card 100 as proof of authorized exit. If the passport information fails to match the current holder of the ICV card 100, the authorities can take appropriate action to detain the cardholder.

If the ICV card 100 is valid, the ICV card 100 is received (step 508) and cardholder is authorized to leave the country. As such, the ICV card 100 is a reusable electronic card and may be reissued to another individual. An ICV card receipt is issued (step 510) to the cardholder for the returned ICV card 100, where the cardholder may now use the ICV card receipt to obtain the deposit fee previously paid either prior to issuance of the ICV card 100 or when cardholder first entered the country's port of entry. The memory means 214 is also updated with the "Exit Status" (step 512) of the cardholder.

In order for the cardholder to obtain a refund of their deposit fee, a valid ICV card receipt must be presented to an appropriate registry in a country other than the country last visited, which may include a money transfer entity like "Western Union"; customs agency and/or an immigration office. Accordingly, the system 100 validates the ICV card receipt (step 514), and if the ICV card receipt is not valid, the system 100 suspends the ICV card 100 (step 516) with the memory means 214 either with a suspension status and/or inactive status, depending on the country's immigration protocols. In either event, the ICV card 100 is suspended (step 516) such that the authorities are alerted that the individual cardholder failed to conform with the country's exit immigration protocols. Not only is the ICV card 100 suspended but also the deposit fee is forfeited (step 518), and the cardholder loses his or her deposit.

However, if the ICV card receipt is valid, the deposit fee is returned (step 520) and the computer's memory means 104 is updated with confirmation of cardholder's exit status (step 522). In this manner Customs and or other appropriate authorities are able to confirm that the individual has left the country.

Figure 6:
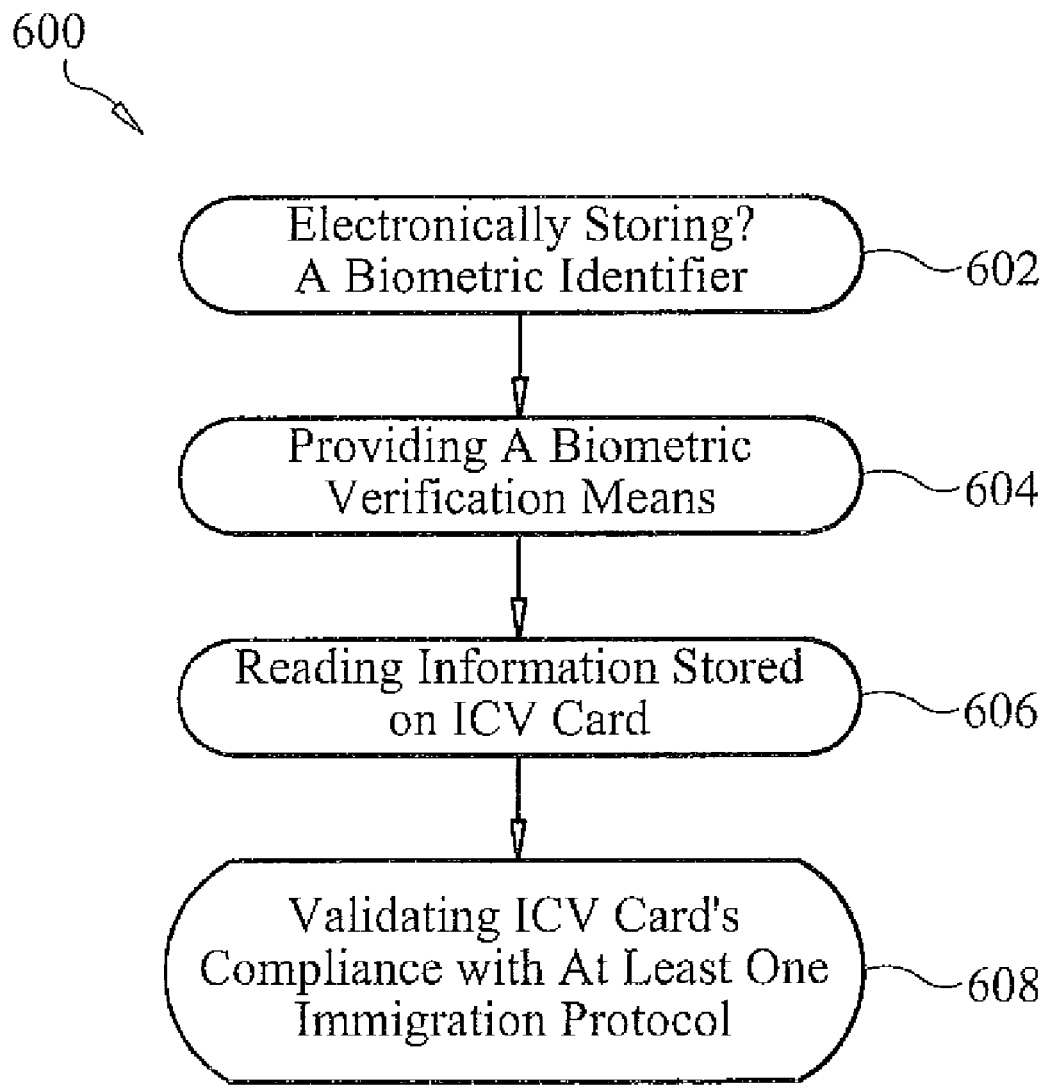
FIG. 6 is a sample flowchart of a block diagram of an exemplary method of processing an ICV card in accordance with one embodiment.

FIG. 6 is a sample flowchart of a block diagram of an exemplary method 600 of processing an ICV card 100 in accordance with one embodiment. The method 600 comprising of electronically storing a biometric identifier 202 on an ICV card 100 (step 602) and providing biometric verification means 102, where the biometric verification means 102 is configured for validating a biometric sample 202 (step 604) with the biometric identifier 202 stored on the ICV card 100.

Passport reader 206 is connected either wired or wirelessly to a computer 208, where the passport reader 206 is configured for reading information stored on the ICV card 100 (step 606), which includes any one or more of the following: the ICV card number 210, biometric sample 204, and/or biometric identifier 202 stored on the ICV card 100, and/or passport information if the passport information is stored thereon.

Computer 208 is configured for validating the ICV card's 100 compliance with at least one immigration protocol (step 608) for obtaining access into a country. As previously described these at least one immigration protocol includes but is not limited to: depositing a fee into a registry; authenticating the identity of the ICV cardholder via at least one biometric verification means 102; accepting receipt of the ICV card 100 upon the ICV cardholder leaving a country; authenticating identity of ICV cardholder for the return of the deposit fee; or returning the deposit fee to the ICV cardholder. As previously disclosed, the ICV card 100 includes biometric verification means 102 positioned thereon, where the biometric verification means 102 includes but is not limited to: fingerprint recognition means, hand geometry recognition means, palm geometry recognition means, iris recognition means, retina recognition means, speech recognition means.

Figure 7:
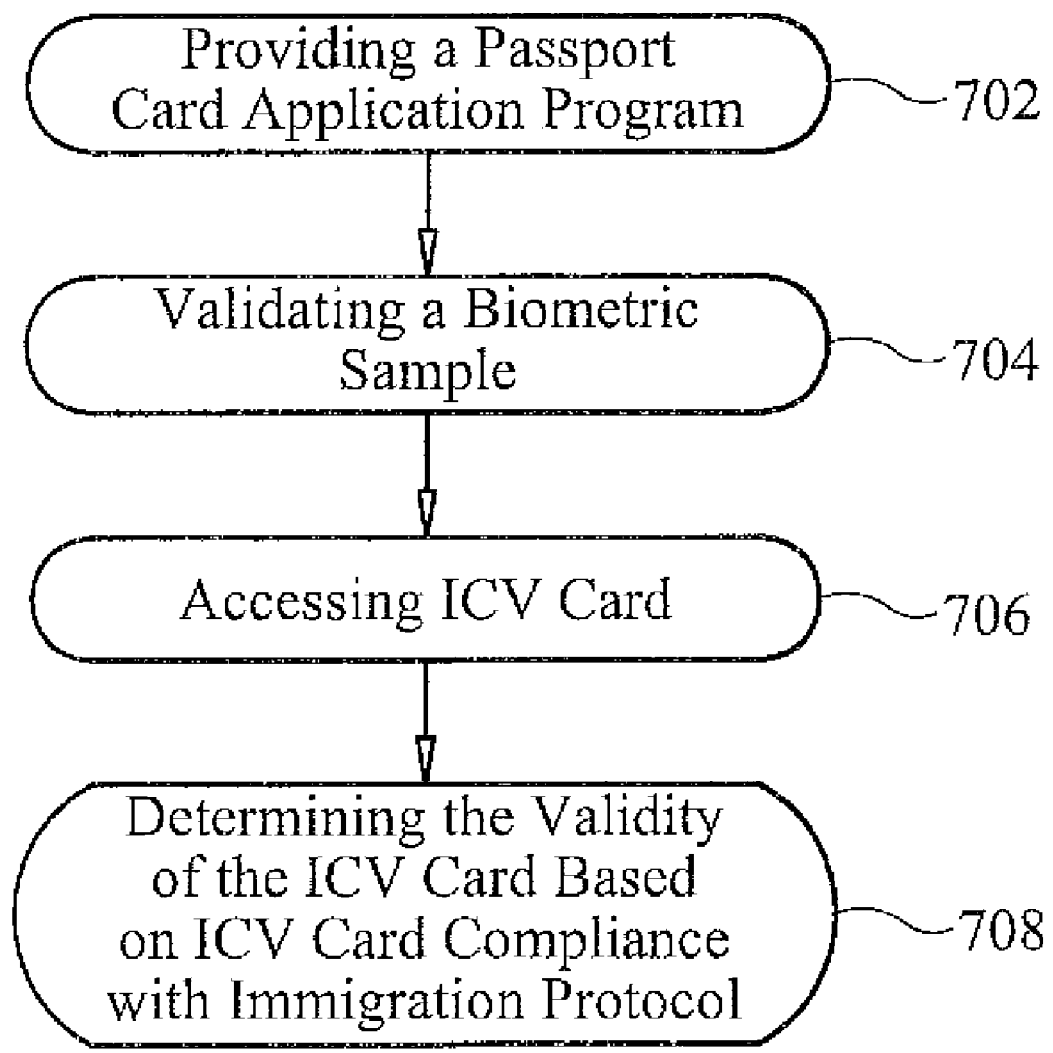
FIG. 7 is a sample flowchart of a block diagram of an exemplary method of processing an ICV card in accordance with an alternate embodiment.

FIG. 7 is a sample flowchart of a block diagram of an exemplary method 700 of processing an ICV card 100 in accordance with an alternate embodiment. The method 700 comprising of providing a passport card application program 212 (step 702) executable on a computer 208, where the passport card application program 212 is capable of processing the information stored on the ICV card 100, i.e. a card number 210, biometric sample 204 and/or biometric identifier 202 and/or passport information, if stored thereon.

The method 700 further comprises validating a biometric sample 204 (step 704) with a biometric identifier 202 stored on the ICV card 100, by the at least one microprocessor 106 and/or a computer 208. As such the method provides the means for securing the cardholder's biometric identifier 202 as the biometric identifier 202 is not transmitted if the verification is performed on the ICV card 100. Passport reader 206 is configured for accessing the ICV card 100 (step 706) via the passport card application program 212 executable on the computer 208.

Once the ICV card 100 has been validated, computer 208 determines the validity of the ICV card 100 based on the ICV card's 100 compliance with at least one immigration protocol (step 708) for obtaining access into a country. The immigration protocol includes but is not limited to: depositing a fee into a registry; authenticating the identity of the ICV cardholder via at least one biometric verification means 102; accepting receipt of the ICV card 100 upon the ICV cardholder leaving a country; authenticating identity of ICV cardholder for the return of the deposit fee; or returning the deposit fee to the ICV cardholder.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of reusable immigration customs visa card, which includes an electronic data card configured for storing a biometric identifier; and at least one microprocessor positioned within, wherein the at least one microprocessor comprises of executable instruction code configured for communicating with a computer for validating the immigration customs visa card's compliance with a requirement of depositing a fee into a registry and for authenticating an identity of a cardholder of said immigration customs visa card for a return of said deposit fee.

2. The apparatus of claim 1, wherein said immigration customs visa card comprises of biometric verification means which includes but is not limited to: fingerprint recognition means, hand geometry recognition means, palm geometry recognition means, iris recognition means, retina recognition means, speech recognition means.

3. The apparatus of claim 2, wherein said fingerprint recognition means includes a fingerprint scanner.

4. The apparatus of claim 1, wherein the at least one microprocessor is configured for processing at least one biometric sample.

5. The apparatus of claim 1, wherein immigration customs visa card comprises of memory means for storing a biometric identifier or at least one passport information.

6. The apparatus of claim 1, wherein said immigration customs visa card comprises of: an electronic circuit, where said electronic circuit includes a circuit board having said at least one microprocessor positioned thereon and connected to a transceiver, wherein said transceiver is configured for communicating with a passport reader or a computer.

7. The apparatus of claim 1, wherein said immigration customs visa card is configured for communicating with said computer in any of the following manner: wirelessly or wired.

8. A system comprising:
   (a) reusable immigration customs visa card configured for electronically storing thereon a biometric identifier; and
   (b) biometric verification means positioned within said immigration customs visa card, where the biometric verification means is configured for validating a biometric sample by comparing said biometric sample with a biometric identifier; and
   (c) a computer configured for validating the immigration customs visa card's compliance with a requirement of depositing a fee into a registry and for authenticating an identity of a cardholder of said immigration customs visa card for a return of said deposit fee.

9. The system of claim 8, wherein said biometric verification means includes but is not limited to: fingerprint recognition means, hand geometry recognition means, palm geometry recognition means, iris recognition means, retina recognition means, speech recognition means.

10. The system of claim 8, comprising of a passport reader connected to said computer configured for reading any one or more of the following: a card number, biometric sample, biometric identifier stored on said immigration customs visa card or passport information.

11. The system of claim 8, comprising of a computer configured for validating said immigration customs visa card's compliance with at least one immigration protocol for obtaining access into a country.

12. The system of claim 11, wherein said at least one immigration protocol includes but is not limited to: authenticating the identity of said immigration customs visa cardholder via at least one biometric verification means; accepting receipt of said immigration customs visa card upon immigration customs visa card holder leaving a country; or returning said deposit fee to said immigration customs visa cardholder.

13. The system of claim 8, wherein said immigration customs visa card is configured for communicating with said computer or passport reader in any of the following manner: wirelessly or wired.

14. A system comprising:
   (a) a passport card application program executable on a computer; and
   (b) at least one microprocessor configured for validating a biometric sample with a biometric identifier stored on reusable immigration customs visa card and wherein the at least one microprocessor comprises of executable instruction code for validating said immigration customs visa card's compliance with a requirement of depositing a fee into a registry and for authenticating an identity of a cardholder of said immigration customs visa card for a return of said deposit fee.

15. The system of claim 14, wherein said immigration customs visa card is configured for being accessed by said passport card application program executable on said computer.

16. The system of claim 14, comprising of said computer's processor configured for determining the validity of an immigration customs visa card based on said immigration customs visa card's compliance with at least one immigration protocol for obtaining access into a country.

17. The system of claim 16, wherein said immigration protocol includes but is not limited to: authenticating the identity of said immigration customs visa cardholder via at least one biometric verification means; accepting receipt of said immigration customs visa card upon immigration customs visa card holder leaving a country; or returning said deposit fee to said immigration customs visa cardholder.

18. The system of claim 17, wherein said biometric verification means includes but is not limited to: fingerprint recognition means, hand geometry recognition means, palm geometry recognition means, iris recognition means, retina recognition means, speech recognition means.

19. A method comprising:
   (a) electronically storing a biometric identifier on reusable immigration customs visa card;
   (b) providing biometric verification means positioned within said immigration customs visa card, where said biometric verification means is configured for validating a biometric sample by comparing said biometric sample with a biometric identifier and
   (c) providing at least one microprocessor positioned within the immigration customs visa card, wherein the at least one microprocessor comprises of executable instruction code configured for communicating with a computer for validating the immigration customs visa card's compliance with a requirement of depositing a fee into a registry and for authenticating an identity of a cardholder of said immigration customs visa card for a return of said deposit fee.

20. The method of claim 19, wherein said biometric verification means includes but is not limited to: fingerprint recognition means, hand geometry recognition means, palm geometry recognition means, iris recognition means, retina recognition means, speech recognition means.

21. The method of claim 20, comprising validating said immigration customs visa card's compliance with at least one immigration protocol for obtaining access into a country.

22. The method of claim 21, wherein said at least one immigration protocol includes but is not limited to: depositing a fee into a registry; authenticating the identity of said immigration customs visa cardholder via at least one biometric verification means; accepting receipt of said immigration customs visa card upon immigration customs visa card holder leaving a country; authenticating identity of immigration customs visa cardholder for the return of said deposit fee; or returning said deposit fee to said immigration customs visa cardholder.

23. The method of claim 20, further comprising communicating with a passport reader or computer by said immigration customs visa card in any of the following manner: wirelessly or wired.

24. The method of claim 19, comprising reading any one or more of the following: a card number, biometric sample, biometric identifier stored on said immigration customs visa card or passport information.

25. A method comprising:
   (a) providing a passport card application program executable on a computer; and
   (b) validating a biometric sample with a biometric identifier stored on an reusable immigration customs visa card;
   (c) validating said immigration customs visa card's compliance with a requirement of depositing a fee into a registry; and
   (d) authenticating an identity of a cardholder of the immigration customs visa card for a return of the deposit fee.

26. The method of claim 25, comprising accessing said immigration customs visa card via said passport card application program executable on said computer.

27. The method of claim 25, comprising determining the validity of an immigration customs visa card based on said immigration customs visa card's compliance with at least one immigration protocol for obtaining access into a country.

28. The method of claim 27, wherein said immigration protocol includes but is not limited to: authenticating the identity of said immigration customs visa cardholder via at least one biometric verification means; accepting receipt of said immigration customs visa card upon immigration customs visa card holder leaving a country; or returning said deposit fee to said immigration customs visa cardholder.

29. The method of claim 28, wherein said biometric verification means includes but is not limited to: fingerprint recognition means, hand geometry recognition means, palm geometry recognition means, iris recognition means, retina recognition means, speech recognition means.

\* \* \* \* \*